(12) United States Patent
Forlong

(10) Patent No.: US 11,267,154 B2
(45) Date of Patent: Mar. 8, 2022

(54) CUTTING MACHINE PART TRANSFER APPARATUS

(71) Applicant: EIGEN SYSTEMS LIMITED, Auckland (NZ)

(72) Inventor: Murray Houlton Forlong, Auckland (NZ)

(73) Assignee: EIGEN SYSTEMS LIMITED, Auckland (NZ)

(*) Notice: Subject to any disclaimer, the term of this patent is extended or adjusted under 35 U.S.C. 154(b) by 142 days.

(21) Appl. No.: 16/495,544

(22) PCT Filed: Mar. 22, 2018

(86) PCT No.: PCT/NZ2018/050035
§ 371 (c)(1),
(2) Date: Sep. 19, 2019

(87) PCT Pub. No.: WO2018/174729
PCT Pub. Date: Sep. 27, 2018

(65) Prior Publication Data
US 2020/0094431 A1   Mar. 26, 2020

(30) Foreign Application Priority Data

Mar. 22, 2017 (NZ) .......................................... 730356
Nov. 6, 2017 (NZ) .......................................... 737039

(51) Int. Cl.
*B26D 7/18* (2006.01)
*B23Q 1/01* (2006.01)
*B26F 1/38* (2006.01)

(52) U.S. Cl.
CPC .............. *B26D 7/18* (2013.01); *B23Q 1/012* (2013.01); *B26F 1/3813* (2013.01); *B23Q 2240/002* (2013.01)

(58) Field of Classification Search
CPC ............. Y10T 83/2183; Y10T 83/0467; Y10T 83/0448; Y10T 83/207; Y10T 83/2098;
(Continued)

(56) References Cited

U.S. PATENT DOCUMENTS 4,012,027 A * 3/1977 Hooper .................. B23K 7/004
266/58
4,372,538 A    2/1983 Balfanz
(Continued)

OTHER PUBLICATIONS

International Search Report from International Patent Application No. PCT/NZ2018/050035, dated Jun. 28, 2018.
(Continued)

*Primary Examiner* — Phong H Nguyen
(74) *Attorney, Agent, or Firm* — Greer, Burns & Crain, Ltd

(57) ABSTRACT

A cutting machine is provided, including: a cutting table having a first end and a second end aligned along an X-axis; a cutting tool gantry configured to cut parts from plate supported on the cutting table, the cutting tool gantry spanning the cutting table in a Y-axis perpendicular to the X-axis and being configured to travel along the X-axis between the first end and the second end; and a part transfer apparatus configured to remove cut parts from the cutting table, the part transfer apparatus being configured to travel along the X-axis between the first end and the second end, wherein the part transfer apparatus is able to pass underneath the cutting tool gantry while travelling along the X-axis. Methods of manufacturing and storing parts are also provided, along with a method of identifying when a part is in contact with a finishing apparatus.

20 Claims, 16 Drawing Sheets

(58) Field of Classification Search
CPC ............... Y10T 83/2185; Y10T 83/463; Y10T 83/4632; Y10T 83/9459; Y10T 83/95; B26D 7/18; B26D 7/1845; B26D 7/1854; B26D 7/1863; B26D 7/20; B23Q 1/012; B23Q 1/01; B23Q 1/03; B23Q 2240/002; B23Q 2240/00; B26F 1/3813; B26F 1/38; B26F 1/3806
See application file for complete search history.

(56) References Cited

U.S. PATENT DOCUMENTS

| | | | |
|---|---|---|---|
| 4,993,296 A * | 2/1991 | Nasu ..................... | B23Q 5/34 |
| | | | 83/422 |
| 5,005,318 A | 4/1991 | Shafir | |
| 5,092,829 A | 3/1992 | Gerber | |
| 5,101,747 A | 4/1992 | Gerber | |
| 5,463,921 A | 11/1995 | Bellio et al. | |
| 5,481,083 A * | 1/1996 | Smyth, Jr. .......... | B23K 26/0838 |
| | | | 219/121.67 |
| 2018/0193964 A1* | 7/2018 | Joos .................. | B23K 37/0408 |

OTHER PUBLICATIONS

Written Opinion of the International Searching Authority from International Patent Application No. PCT/NZ2018/050035, dated Jun. 28, 2018.

* cited by examiner

CUTTING MACHINE PART TRANSFER APPARATUS

BACKGROUND

The invention relates to a part transfer apparatus or part unloading apparatus for a cutting machine or other part processing machine. Additionally, embodiments of the invention are directed towards cutting machines having large cutting tables from which cut parts are able to be removed with a part transfer apparatus.

Many cutting machines cut parts from large metal plates supported on a cutting table. Various processes may be performed, including cutting parts a parent plate, for example by thermal cutting processes that cut part profiles (e.g. oxyfuel cutting or plasma cutting).

In some existing machines, once a parent plate has been cut into the required parts, a person may be required to climb up onto the table and lift the small parts out of the skeleton of the parent plate manually and carry them off the table to be stacked on pallets. Larger parts that cannot be lifted manually may be lifted from the table using an overhead crane and lifting mechanisms such as magnets for ferrous materials, vacuum equipment or with hooks and chains.

Because of the inherent risk of climbing on the cutting table and the bending down when standing on the plate to remove the parts, the work for the person removing cut parts may be tedious, strenuous and is a high-risk activity. Additionally, the use of an overhead crane such as may be installed above a factory floor may be slow to use and may mean that other operations requiring the use of the crane may need to wait.

As many parts are cut from large plate, the person removing the parts may need to be able to identify the parts for different jobs or customers and separate and store these together once removed from the cut plate. In many instances the parts may look very similar often with minor measurements being the difference. For example, rectangular parts that are fractionally different dimensionally may be difficult to distinguish between. This may require time and accurate measuring of the parts to ensure they are not mixed up.

In order to have high machine utilization, the cutting table may have two or more zones for the plates to be processed. This is achieved by a cutting table long enough to support two or more plates so that the cutting machine can process one plate at one end while at the other end of the table cut parts are manually removed from a previously cut plate. When all the cut parts are removed the remaining plate skeleton is removed and a new plate is loaded. The cutting machine oscillates between the two zones, processing the new plates while the machine operators move to unload the previously processed plate before loading a new plate to be cut next. This enables the parts to be manually removed simultaneously with cutting of the parts.

It is an object of the invention to provide an improved cutting machine part transfer apparatus. Alternatively, it is an object of the invention to provide an improved cutting machine. Alternatively, it is an object of the invention to provide an improved method of manufacturing a part. Alternatively, it is an object of the invention to at least provide the public with a useful choice.

SUMMARY

According to a first aspect of the invention there is provided a cutting machine comprising:

a cutting table having a first end and a second end aligned along an X-axis;

a cutting tool gantry configured to cut parts from plate supported on the cutting table, the cutting tool gantry spanning the cutting table in a Y-axis perpendicular to the X-axis and being configured to travel along the X-axis between the first end and the second end; and a part transfer apparatus configured to remove cut parts from the cutting table, the part transfer apparatus being configured to travel along the X-axis between the first end and the second end, wherein the part transfer apparatus is able to pass underneath the cutting tool gantry while travelling along the X-axis.

Preferably, the part transfer apparatus is configured to lift cut parts vertically from the cutting table, move the cut parts horizontally, rotate the cut parts and release the cut parts away from the cutting table.

Preferably, the lifting mechanism is configured to lift cut parts off the cutting table in a direction parallel to a vertical Z-axis perpendicular to both the X-axis and the Y-axis, the part transfer apparatus being configured to move the lifting mechanism with respect to the cutting table parallel to the X-axis and the Y-axis to lift a cut part up off the cutting table with the lifting mechanism, move said cut part horizontally, and release said cut part away from the surface of the cutting table.

Preferably, the part transfer apparatus and the cutting tool gantry are each configured to move between the first end and the second end of the cutting table independently of each other.

Preferably, the part transfer apparatus comprises:
a horizontal transfer assembly configured to travel parallel to the X-axis between the first end and the second end of the cutting table; and
a lifting mechanism provided to the horizontal transfer assembly,
wherein the part transfer apparatus is configured to lift a cut part vertically off the cutting table with the lifting mechanism and move the cut part horizontally away from the cutting table with the horizontal transfer assembly.

Preferably, the horizontal transfer assembly comprises a part transfer gantry spanning the cutting table parallel to the Y-axis, the part transfer gantry being moveably supported on part transfer gantry rails.

Preferably, the cutting tool gantry is moveably supported on cutting tool gantry rails located outwardly of the pair of part transfer gantry rails with respect to the cutting table.

Preferably, the horizontal transfer assembly comprises an extendable portion moveably supported on the part transfer gantry and configured to move with respect to the part transfer gantry parallel to the Y-axis, the lifting mechanism being supported on the extendable portion.

Preferably, the extendable portion is telescopically connected to the part transfer gantry.

Preferably, the lifting mechanism is moveably supported on the extendable portion to move along the extendable portion.

Preferably, the lifting mechanism comprises a part engaging portion configured to be moved vertically with respect to the part transfer gantry.

Preferably, the part engaging portion is rotatable with respect to the part transfer gantry.

Preferably, the cutting machine is configured to remove previously cut parts from a first plate towards the first end of the cutting table with the part transfer apparatus while cutting parts from a second plate towards the second end of the cutting table with the cutting tool gantry.

Preferably, the cutting machine is configured to subsequently move the cutting tool gantry from the first end to the second end to cut parts from a third plate and move the part transfer apparatus from the second end to the first end to remove previously cut parts from the second plate.

Preferably, the cutting machine comprises a grinder configured to grind cut parts, the part transfer apparatus being configured to move cut parts to the grinder for grinding.

Preferably, the part transfer apparatus is configured to bring parts into contact with the grinder to grind edges of the parts.

Preferably, the cutting machine receives a signal indicating that the cut part is in contact with the grinding wheel. In some embodiments, the signal indicates a speed of the grinding wheel. In some embodiments, the signal indicates a load on the motor of the grinding wheel.

Preferably, the cutting machine comprises a marking system for marking cut parts, the part transfer apparatus being configured to move cut parts to the marking system for marking.

Preferably, the cutting machine is configured to move the cut parts over the marking system with the part transfer apparatus to mark the underside of the parts.

Preferably, the marking system comprises an inkjet marker.

According to a second aspect of the invention, there is provided a part transfer apparatus for a cutting machine, the cutting machine having a cutting tool gantry with at least one cutting tool configured to cut parts from a plate supported on a cutting table, the cutting table having a first end and a second end aligned along an X-axis, the part transfer apparatus comprising:
- a horizontal transfer assembly configured to travel parallel to the X-axis between the first end and the second end, the horizontal transfer assembly configured to pass underneath the cutting tool gantry while travelling along the X-axis; and
- a lifting mechanism provided to the horizontal transfer assembly,
- wherein the part transfer apparatus is configured to lift a cut part vertically off the cutting table with the lifting mechanism and move the cut part horizontally away from the cutting table with the horizontal transfer assembly.

Preferably, the horizontal transfer assembly comprises a part transfer gantry configured to span across the cutting table parallel to a Y-axis perpendicular to the X-axis.

Preferably, the horizontal transfer assembly comprises an extendable portion moveably supported on the part transfer gantry and configured to move with respect to the part transfer gantry parallel to the Y-axis, the lifting mechanism being supported on the extendable portion.

Preferably, the extendable portion is telescopically connected to the part transfer gantry.

Preferably, the lifting mechanism is moveably supported on the extendable portion to move along the extendable portion.

Preferably, the part transfer gantry comprises a part transfer gantry frame and the outwardly extending portion comprises an outwardly extendable frame moveably supported by the part transfer gantry frame.

Preferably, the part transfer gantry frame comprises vertical end support portions supporting a pair of parallel and spaced apart cross beam members spanning between the vertical support portions.

Preferably, the outwardly extendable frame is moveably supported between the pair of cross beam members.

Preferably, the outwardly extendable frame comprises a pair of end members and a pair of parallel and spaced apart lifting mechanism guide members, the lifting mechanism guide members aligned parallel to and moveably supported by the pair of cross beam members, the lifting mechanism being moveably supported by the lifting mechanism guide members.

Preferably, the lifting mechanism comprises a part engaging portion configured to be moved vertically with respect to the part transfer gantry. In some embodiments, the part engaging mechanism comprises a magnetic engagement system configured to magnetically engage with a cut part.

Preferably, the lifting mechanism is telescopically extendible to move the part engaging portion vertically.

Preferably, the part engaging portion is rotatable with respect to the part transfer gantry.

Preferably, the part transfer apparatus comprises a part transfer mechanism drive motor configured to drive the part transfer gantry to move in the X-axis. Preferably, the part transfer mechanism comprises an extendable portion drive motor configured to drive the extendable portion to move in the Y-axis. Preferably, the lifting mechanism comprises a vertically travelling portion drive motor configured to drive the vertically travelling portion to move in a vertical Z-axis. Preferably, the lifting mechanism comprises a part engaging mechanism drive motor configured to drive the part engaging mechanism to rotate about the Z-axis.

According to a third aspect of the invention there is provided a cutting machine comprising the part transfer apparatus of the second aspect of the invention.

According to a fourth aspect of the invention there is provided a cutting machine comprising:
- a cutting table configured to support a plate thereon;
- a cutting tool gantry having at least one cutting tool mounted thereon, the cutting tool gantry configured to cut parts from a plate supported on the cutting table; and
- a part transfer gantry configured to remove cut parts from the cutting table.

Preferably, the cutting tool gantry and the part transfer gantry are configured to move to switch between ends of the cutting table.

Preferably, the cutting tool gantry is supported on a first pair of rails, the cutting table being located between the first pair of rails, and the part transfer gantry is supported on a second pair of rails, each one of the second pair of rails being located inside of the first pair of rails.

Preferably, the part transfer gantry comprises a width less than a width of the cutting tool gantry and a height less than a height of the cutting tool gantry.

Preferably, the part transfer gantry is able to pass underneath the cutting tool gantry so that the first gantry and the second gantry are able to switch between ends of the cutting table.

Preferably, the cutting machine is configured to cut parts from a first plate towards a first end of the cutting table with the cutting tool gantry and unload previously cut parts from a second plate at a second end of the cutting table with the part transfer gantry.

According to a fifth aspect of the invention there is provided a cutting machine, the cutting machine comprising:
- a cutting table for supporting at least one plate to be cut;
- a cutting tool gantry having one or more cutting tools configured to cut parts from the plate, the cutting tool gantry configured to travel along a pair of cutting tool gantry rails, the cutting table located between the cutting tool gantry rails;

a part transfer gantry configured to remove cut parts from the cutting table, the part transfer gantry configured to travel along a pair of part transfer gantry rails, each one of the pair of part transfer gantry rails being provided between the cutting table and respective one of the cutting tool gantry rails.

Preferably, the cutting tool gantry and the part transfer gantry are configured to move to switch between ends of the cutting table.

Preferably, the part transfer gantry comprises a width less than a width of the cutting tool gantry and a height less than a height of the cutting tool gantry.

Preferably, the part transfer gantry is able to pass underneath the cutting tool gantry so that the cutting tool gantry and the part transfer gantry are able to switch between ends of the cutting table.

Preferably, the cutting machine is configured to cut parts from a first plate towards a first end of the cutting table with the cutting tool gantry while unloading previously cut parts from a second plate at a second end of the cutting table with the part transfer gantry.

According to a sixth aspect of the invention there is provided a method of cutting and storing parts with a cutting machine comprising at least one cutting tool to cut parts from one or more plates and a part transfer apparatus to transfer cut parts away from the one or more plates, the method comprising:

receiving part profile data defining shape and location of a plurality of parts to be cut from a plate;

cutting the parts from the plate with the cutting tool based on the part profile data; and transferring the parts away from the plate with the part transfer apparatus based at least on the part profile data.

Preferably, the method further comprises receiving storage data indicating a predetermined storage arrangement of the parts.

Preferably, the method further comprises transferring the parts away from the plate with the part transfer apparatus based on the part profile data and the storage data.

Preferably, the predetermined storage data comprises a predetermined storage location for each part, and the method comprises:

identifying movement required to move each part from the plate to its respective predetermined storage location;

transferring each part from the plate to its respective predetermined storage location with the part transfer apparatus.

Preferably, the method comprises identifying horizontal movement required to transfer each part to its respective predetermined storage location.

Preferably, the method comprises identifying vertical movement required to transfer each part to its respective predetermined storage location.

Preferably, the predetermined storage data comprises a predetermined storage orientation for each part, and the method comprises:

identifying rotational movement required to deliver each part in its respective predetermined orientation;

rotating each part to its respective predetermined orientation during transfer with the part transfer apparatus.

Preferably, the method comprises:

identifying horizontal and rotational movement required to move each part to a grinder and to grind edges of each part before delivering each part to its respective predetermined storage location; and moving each part to the grinder and rotating the part to grind the edges of the part during transfer with the part transfer apparatus.

Preferably, the method comprises:

identifying horizontal and rotational movement required to move each part to a marking system for marking before delivering each part to its respective predetermined storage location; and moving each part to the marking system for marking during transfer with the part transfer apparatus.

Preferably, the storage data comprises stacking data defining one or more stacks of parts, the method further comprising transferring the parts based on the stacking data.

Preferably, the method comprises transferring each part with the part transfer apparatus to the respective predetermined storage location for each part based on the stacking data to form the one or more stacks of parts based on the stacking data.

Preferably, the part profile data defines shape and location of a plurality of parts to be cut from a plate based a location of the plate.

Preferably, the location of the plate is determined by the cutting machine. In some embodiments, the location of the plate is determined by a measuring tool on a cutting tool gantry (e.g. a laser, probe or the like).

According to a seventh aspect of the invention there is provided a cutting machine configured to perform the method of the sixth aspect of the invention.

According to an eighth aspect of the invention there is provided a method of manufacturing a part cut from a plate with a cutting machine comprising a cutting tool and a part transfer apparatus, the method comprising:

cutting a parent plate with the cutting tool to produce a cut part based on part profile data defining a profile of the cut part;

moving the cut part with the part transfer apparatus to a grinder and grinding the cut part based on the part profile data.

Preferably, the method comprises grinding one or more edges of the cut part based on the part profile data.

Preferably, the method comprises translating the cut part from the parent plate to the grinder and rotating the cut part, with the part transfer apparatus, to grind the edges of the cut part.

Preferably, the method comprises identifying a location of the cut part in relation to the parent plate based on the part profile data. Preferably, the method comprises identifying the location of the edges of the cut part using the part profile data.

Preferably, the method comprises receiving a signal from the grinder and identifying that the cut part is in contact with the grinder based on the signal. In some embodiments, the signal indicates the speed of a grinding wheel of the grinder. The method may comprise identifying that the cut part is in contact with the grinder based on a reduction in speed of the grinding wheel. In some embodiments, the signal indicates a load on a motor driving the grinding wheel. The method may comprise identifying that the cut part is in contact with the grinder based on an increase in the load on the motor. In some embodiments the signal indicates torque output of a motor driving the grinding wheel.

Preferably, the method comprises moving the cut part to a marking system based on the part profile data and marking the cut part. Preferably, the method comprises moving the cut part over an inkjet marker.

According to a ninth aspect of the invention there is provided a cutting machine configured to perform the method of the eighth aspect of the invention.

According to a tenth aspect of the invention there is provided a method of manufacturing a part cut from a plate with a cutting machine comprising a cutting tool and a part transfer apparatus, the method comprising:
- cutting a parent plate with the cutting tool to produce a cut part based on part profile data defining a profile of the cut part;
- moving the cut part with the part transfer apparatus to a marking system and marking the cut part based on the part profile data.

Preferably, the method comprises identifying the location of the cut part in relation to the parent plate based on the part profile data. Preferably, the method comprises identifying movement required to bring the cut part from the location of the cut part in relation to the parent plate to the marking system.

Preferably, the marking system comprises an inkjet marker and the method comprises moving the cut part to a position over the inkjet market based on the part profile data to be marked by the inkjet marker.

According to an eleventh aspect there is provided a cutting machine configured to perform the method according to the tenth aspect of the invention.

According to a twelfth aspect of the invention there is provided a method of identifying that a part is in contact with a grinder, comprising:
- receiving a signal from the grinder;
- identifying that the part is in contact with the grinder based on the signal.

In some embodiments, the signal indicates the speed of a grinding wheel of the grinder.

The method may comprise identifying that the cut part is in contact with the grinder based on a reduction in speed of the grinding wheel.

In some embodiments, the signal indicates a load on a motor driving the grinding wheel.

The method may comprise identifying that the cut part is in contact with the grinder based on an increase in the load on the motor.

In some embodiments, the signal indicates a torque output of a motor driving the grinding wheel.

The method may comprise identifying that the cut part is in contact with the grinder based on an increase in the torque output of the motor.

According to a thirteenth aspect of the invention there is provided a cutting machine configured to perform the method of the twelfth aspect of the invention.

According to a tenth aspect of the invention there is provided a cutting machine comprising:
- at least one cutting tool configured to cut parts from a plate supported on a cutting table;
- a finishing apparatus for finishing surfaces and/or edges of parts cut from the plate; and
- a part transfer apparatus configured to transfer parts cut from the plate, the part transfer apparatus configured to move parts to the finishing apparatus and bring the parts into contact with the finishing apparatus to finish surfaces and/or edges of the parts.

Preferably, the cutting machine comprises a controller configured to control the part transfer apparatus to move parts to the finishing apparatus to finish surfaces and/or edges of the parts, the controller configured to receive a signal from the finishing apparatus and identify based on the signal that a part is in contact with the finishing apparatus.

Preferably, the finishing apparatus comprises a wheel speed encoder configured to generate the signal, the signal indicating the speed of a wheel of the finishing apparatus.

Preferably, the finishing apparatus comprises a motor configured to drive a moving part of the finishing apparatus, the signal indicating load on the motor.

Preferably, the finishing apparatus comprises a grinder.

Further aspects of the invention, which should be considered in all its novel aspects, will become apparent to those skilled in the art upon reading of the following description which provides at least one example of a practical application of the invention.

BRIEF DESCRIPTION OF THE DRAWINGS

FIG. 6b is a perspective detail view illustration of a lifting mechanism of the cutting machine of FIG. 6a;

FIG. 6c is a perspective detail view illustration of a grinder of the cutting machine of FIG. 6a;

FIG. 8b is a detail perspective view illustration of a lifting mechanism of the cutting machine of FIG. 8a;

FIG. 8c is a detail perspective view illustration of a marking system of the cutting machine of FIG. 8a;

DETAILED DESCRIPTION

Preferred embodiments of the invention relate to a part transfer apparatus for operation with a cutting machine configured to cut plate. The part transfer apparatus may also be considered a part unloading apparatus or part removal apparatus. The part transfer apparatus according to preferred embodiments enables cut parts to be lifted vertically from a cutting table, rotated, translated horizontally and then lowered vertically onto a storage area, such as on a pallet, or a conveyor.

In some embodiments, the cutting machine may comprise a cutting tool gantry and a part transfer apparatus which able to process independent plates positioned at opposite ends of a cutting table so that the cutting tool gantry can cut a plate at one end while the part transfer apparatus simultaneously unloads previously cut parts from a plate at the other end. Once the cutting tools and the part unloading apparatus have completed their respective processes, the part unloading apparatus and the cutting tool gantry can relocate to the opposite ends of the table (i.e. switching between ends) with the part transfer apparatus passing underneath of the cutting tool gantry. The part transfer apparatus is able to position a part picking head (e.g. a lifting mechanism) above cut parts, lower down and secure the part with a magnet or vacuum and raise the cut part out of the plate and above the plate. The part unloading apparatus is then able to move the cut part horizontally and rotationally to a point outside of the cutting table to a predetermined position away from the cutting table (e.g. to stack the part on a pallet or place it onto a conveyor system).

The invention is in no way limited to these preferred embodiments as they are purely to exemplify the invention only and that possible variations and modifications would be readily apparent without departing from the scope of the invention.

When cutting operations (e.g. thermal cutting operations such as plasma cutting, laser cutting, oxyacetylene cutting and the like, or other cutting operations such as waterjet cutting) are carried out by a cutting machine on flat plate, the resultant cut parts are left on a surface of the cutting table within a skeleton of the plate and need to be removed.

Figure 1:
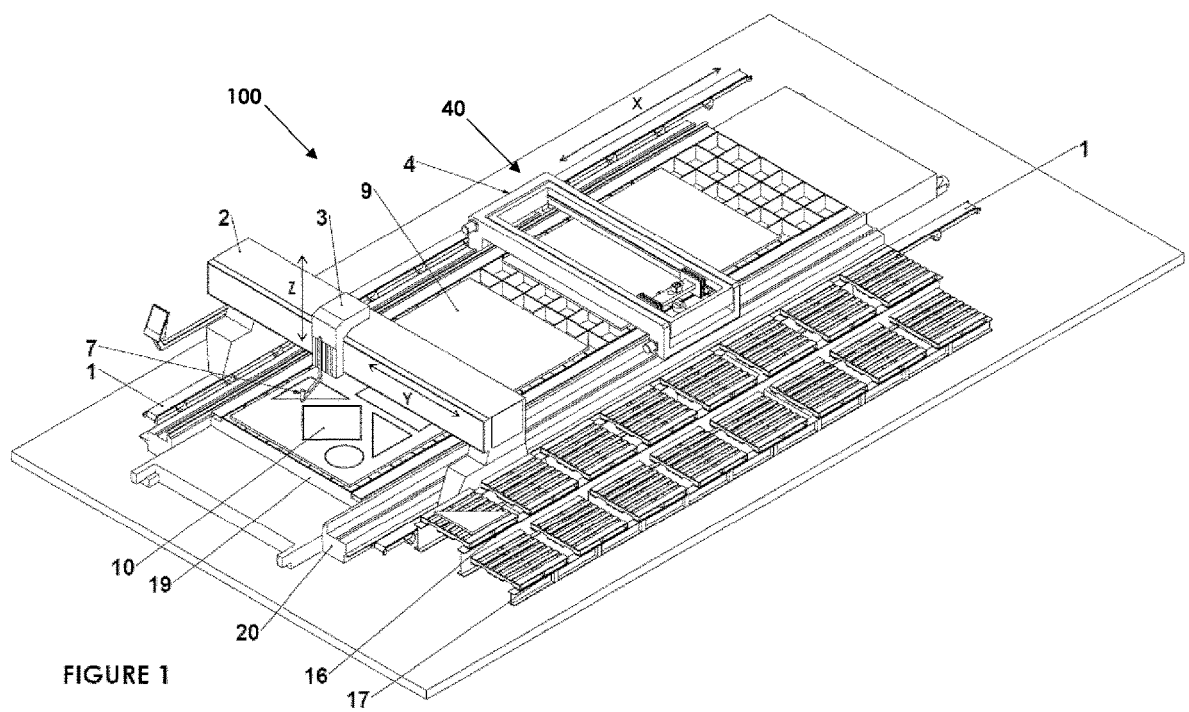
FIG. 1 is a perspective view illustration of a cutting machine in accordance with a first preferred embodiment of the invention and which shows a cutting tool gantry in a zone towards a front end of the cutting table and a part transfer apparatus in a zone towards a back end of the cutting table.

FIG. 1 shows a cutting machine 100 with cutting tool gantry rails 1 and a cutting tool gantry 2 that travels in a horizontal direction parallel to an X-axis along the cutting tool gantry rails 1. In this embodiment the cutting machine comprises a carriage 3 movably mounted on the cutting tool gantry 2. The carriage 3 is adapted to move in a horizontal direction parallel to a Y-axis substantially at a right angle to the direction of travel of the cutting tool gantry 2, which in this embodiment is the X-axis. In this embodiment the cutting machine has a short Y-axis and long X-axis travel. Embodiments of the invention are particularly suited but not limited to thermal cutting machines with long horizontal X-axis travel. In some embodiments the X-axis is over 40 feet (approx. 12 metres) of travel.

The cutting machine 100 comprises a cutting table 19 configured to support a plate 9. The cutting tool gantry 2 comprises one or more cutting tools configured to cut the plate 9. Carriage 3 is fitted with a cutting tool 7 which in this embodiment is a thermal cutting head. The cutting machine 100 is configured to move the cutting tool 7 in a vertical, Z-axis, direction with respect to the cutting tool gantry 2 to enable the cutting tool 7 to cut the plate. In this embodiment the cutting tool 7 comprises a plasma torch (connecting hoses and cables to various moving assemblies on the cutting machine are not shown in the Figures, for clarity). In other embodiments any number of cutting tools may be installed on the cutting machine. For example, in alternative embodiments the cutting machine (or cutting machine with which the invention is used) may be configured to perform any one or more of various cutting processes such as water jet cutting, routing, oxy-fuel cutting and laser cutting. In other embodiments the cutting tool gantry may also be configured to perform machining operations on the plate or parts cut from the plate, and may have a tool spindle configured to machine the plate.

As shown in FIG. 1, the cutting tool 7 has cut a number of parts 10 from the plate 9 supported on the cutting table 19.

The cutting machine also comprises a part transfer apparatus 40. The part transfer apparatus 40, in this embodiment, comprises a horizontal transfer mechanism configured to travel parallel to the X-axis. In this embodiment the horizontal transfer mechanism comprises a part transfer gantry 4 configured to move along the cutting table in a direction parallel to the X-axis. The part transfer gantry 4 spans across the cutting table 19 in the Y-axis, and is supported on either side of the cutting table 19. In other embodiments the part transfer mechanism may have a different structure, such as one or more low profile arms or other structures configured to move or travel and support a lifting mechanism to transfer cut parts. The part transfer gantry 4 is particularly suited to lifting heavy parts as it is supported at both ends (e.g. on either side of the cutting table 19).

The part transfer apparatus is configured to be automated to unload cut parts from the machine by transferring the cut parts 10 from the surface of the cutting table 19 to a location adjacent the cutting machine. The part transfer apparatus comprises a lifting mechanism provided to the horizontal transfer assembly, configured to lift a cut part up off the cutting table 19 (e.g. in a vertical direction parallel to a Z-axis). Furthermore, the part transfer apparatus is configured to move the cut part horizontally, and then release the cut part away from the surface of the cutting table, such as alongside the cutting machine, directly onto a pallet in some embodiments. In this embodiment, the part transfer apparatus is configured to move (e.g. carry, transport, transfer) cut parts 10 in both the X-axis and Y-axis.

FIG. 2a and FIG. 2b show the part transfer mechanism separately from the cutting machine.

The part transfer apparatus 40 comprises an extendable portion 5 moveably supported by the part transfer gantry 4 and configured to move parallel to the Y-axis relative to the part transfer gantry 4. The extendable portion 5 is configured to extend outwardly from the part transfer gantry 4. In this embodiment the extendable portion 5 comprises an outwardly extendable frame configured to telescopically extend outwardly from within the gantry. In other embodiments the extendable portion 5 may not be arranged to extend from within the part transfer gantry 4, but instead may be slideably or otherwise moveably mounted on top, underneath or on the sides of the structure of the part transfer gantry 4. An arrangement in which the extendable portion 5 extends from within the part transfer gantry 4 assists in providing a low-profile part transfer apparatus, which is particularly advantageous in enabling the part transfer apparatus 40 to easily pass underneath the cutting tool gantry 2. Telescopic assemblies are particularly advantageous in achieving a low profile for the part transfer apparatus 40.

In this embodiment the extendable portion 5 is driven by an extendable portion drive motor 12 configured to drive the extendable portion 5 to extend out from the part transfer gantry 4.

As discussed above, the part transfer apparatus 40 comprises a lifting mechanism 6 configured to lift cut parts from the cutting table. In this embodiment the lifting mechanism 6 is moveably supported by the horizontal transfer assembly 4 and is configured to move in the Y-axis relative thereto. More particularly, the lifting mechanism 6 is moveably supported by the extendable portion 5 of the horizontal transfer assembly to move along the extendable portion 5. The part transfer apparatus is configured to move the lifting mechanism 6 with respect to a cutting table in both X-axis and Y-axis directions. In this embodiment the part transfer apparatus 40 moves the lifting mechanism 6 in the X-axis by moving the horizontal transfer mechanism along the X-axis. Additionally, the part transfer apparatus 40 moves the lifting mechanism 6 in the Y-axis by moving the lifting mechanism 6 along the extendable portion 5 and/or by moving the extendable portion 5 along the part transfer gantry 4.

The lifting mechanism 6 comprises a part engaging mechanism 21 configured to engage with a cut part to lift the cut part. Any suitable part engaging mechanism may be employed. In this embodiment the part engaging mechanism 21 is a magnetic engagement system configured to magnetically engage with a cut part. Any type of magnetic engagement system may be utilised, such as an electromagnetic lifter as is known in the art. In other embodiments other part engaging mechanisms may be employed, such as a vacuum lifting system.

In this embodiment the part engaging mechanism 21 is configured to be moved vertically with respect to the part transfer gantry 4 by the lifting mechanism 6. The lifting mechanism 6 in this embodiment is telescopically extendable to move the part engaging portion 21 vertically. The part engaging portion 21 is configured to be lowered and raised in order to bring it to the part to be engaged with and lifted. For example, to lift a cut part, the lifting mechanism 6 is configured to lower the part engaging mechanism 21 into contact with, or at least close to, the cut part. After activation of the magnetic engagement system the cut part is lifted by raising of the part engaging mechanism 21. The lifting mechanism 6 comprises a vertical lifting drive motor 13 configured to drive the part transfer mechanism 21 to move in the Z-axis.

In this embodiment, the lifting mechanism 6 comprises vertically telescoping supports 61 configured to telescopically extend downward to bring the part engaging mechanism 21 to the plate. The vertically telescoping supports 61 form a telescopic guide system to lower part engaging portion 21. The vertically telescoping supports may be formed from multiple (e.g. 2, 3 or more) parts which move relative to each other. In this embodiment the part engaging portion 21 is supported by a vertically telescoping support on either side. In alternative embodiments only one, or more than two, vertically telescoping supports may be provided to support the part engaging mechanism 21. In further embodiments the lifting mechanism 6 may comprise a different mechanism for bringing a part engaging mechanism towards a cut part, such as one or more actuators or cables, or a scissor-lift arrangement. In this embodiment the part engaging portion comprises a horizontal cross beam supported by the vertically telescoping supports 61 at each end.

The lifting mechanism 6 is configured to move along the extendable portion 5 in a direction parallel to the Y-axis (e.g. transversely across the cutting table 19) from a retracted position shown in FIG. 2a to an extended position shown in FIG. 2b. The lifting mechanism 6 may be driven by a lifting mechanism drive motor 13 configured to drive the lifting mechanism 6 to move in a direction parallel to the Y-axis and relative to the extendable portion 5. Alternatively the part transfer apparatus may comprise a driving assembly to automatically drive the lifting mechanism 6 to move along the extendable portion 5 when the extendable portion 5 is driven to extend outwardly from the part transfer gantry 4.

The lifting mechanism 6 is configured to rotate cut parts in a horizontal plane (e.g. about an axis parallel to the Z-axis, a vertical axis). In a preferred embodiment, the part engaging mechanism 21 is rotated with respect to the lifting mechanism 6 in order to rotate the cut part. Specifically, the part engaging mechanism 21 is rotated using a part engaging mechanism drive motor 8, in this embodiment. The part engaging mechanism 21 is rotated relative to the part transfer gantry 4 and extendable portion 5 about a vertical axis. The part engaging mechanism drive motor 8 is, in this embodiment, supported on the cross beam supported by the vertically telescoping supports 6.

Figure 3:
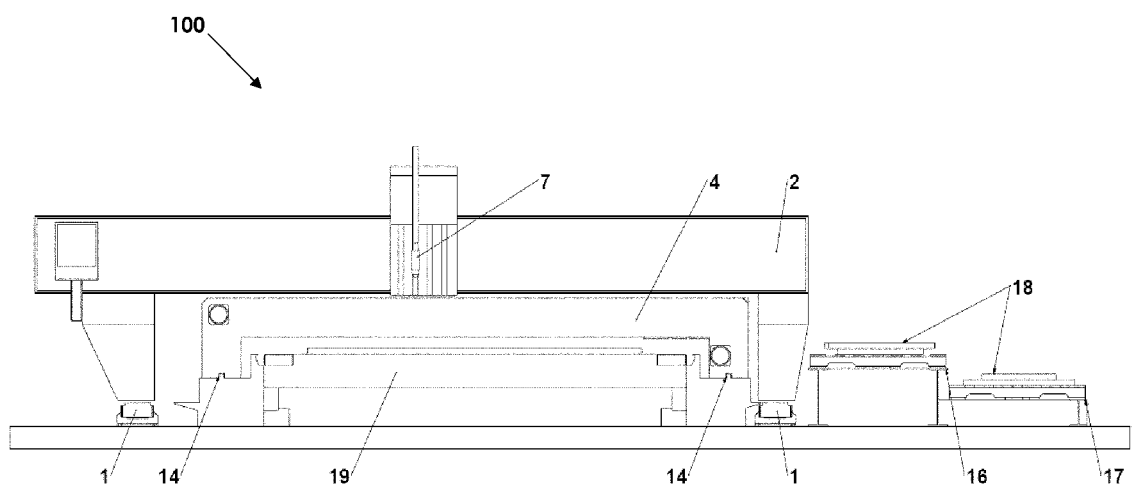
FIG. 3 is an end view illustration of the cutting machine of FIG. 1, also having pallets adjacent to the cutting machine.

Advantageously, the part transfer apparatus 40 is configured to pass underneath the cutting tool gantry 2. This allows the part transfer gantry 4 and cutting tool gantry 2 to swap ends of the cutting table 19 (e.g. to move to switch between ends of the cutting table 19). FIG. 3 is a front view of the cutting machine, showing the cutting tool gantry 2 mounted on cutting tool gantry rails 1 (which are aligned with the long axis of the machine) and also shows the part transfer gantry 4. The part transfer apparatus 40 is able to occupy a space between (e.g. fit between) the cutting tool gantry 2 and the cutting table 19. The enables the part transfer gantry 4 to travel along the cutting table 19 without interfering with the cutting tool gantry 2, for example when switching positions with the cutting tool gantry 2. As shown in FIG. 3, the part engaging mechanism 21 is lifted (e.g. retracted) clear of the plate 9 supported on the surface of cutting table 19. The cutting tool 7 is also retracted clear of the part transfer gantry 4 to enable the part transfer gantry 4 to pass underneath the cutting tool gantry 2. As shown in FIG. 3, the part transfer gantry 4 comprises an outside width less than an inside width of the cutting tool gantry 2 and an outside height less than an inside height of the cutting tool gantry 2. Accordingly, the part transfer gantry 4 and cutting tool gantry 2 are able to be arranged so that the part transfer gantry 4 can pass under the cutting tool gantry 2 without interfering with each other.

In this embodiment, the cutting tool gantry 2 is movably supported on a pair of cutting tool gantry rails 1 on either side of the cutting table 19. Similarly, the part transfer gantry 4 is movably supported on a pair of part transfer gantry rails 14. As shown, the part transfer mechanism rails 14 are located on either side of the cutting table 19 between the cutting table 19 and cutting tool gantry rails 1. The part transfer mechanism rails 14 are located inside of and parallel to the cutting tool gantry rails 1. The cutting tool gantry rails 1 are outside of the part transfer mechanism rails 14. As shown, the cutting tool gantry 2 is supported on a pair of cutting tool gantry rails 1, with the cutting table 19 being located between the cutting tool gantry rails 1, and the part transfer gantry 4 is supported on a pair of part transfer gantry rails 14, each one of the part transfer gantry rails 14 being located between the cutting table 19 and a respective one of the cutting tool gantry rails 1. More generally, the part transfer gantry rails may be located inside of the cutting tool gantry rails. The part transfer gantry rails may be on the cutting tool gantry rails, between the cutting tool gantry rails and the table or on the cutting table. In this embodiment, the part transfer apparatus 40 comprises a long axis rack and pinion drive system which is parallel to the part transfer gantry rails 14 to drive the part transfer gantry 4 along the part gantry rails 14. In other embodiments, other mechanisms for driving the gantries may be employed (e.g. a chain drive or screw drive).

A particular advantage of the extendable portion 5 is that the part transfer apparatus 40 is able to unload parts outside of the cutting tool gantry rails 1. This may make it easier for the parts to be moved elsewhere, for example by forklifts. Since the extendable portion 5 telescopes (or otherwise extends) out from the part transfer gantry 4, the part transfer apparatus 40 is able to travel underneath/within the cutting tool gantry 2 while still able to deposit cut parts on the other side (i.e. outside of) the cutting tool gantry rails 1. However, in some embodiments of the invention, the part transfer apparatus does not have an extendable portion. In such an embodiment the part transfer apparatus may be made wider than the cutting table to leave a space between one of the part transfer gantry rails and the cutting table. A conveyor or, if room allows for storage and access, pallets, can be placed between the table and one or both of the part transfer gantry rails. Such an embodiment may simplify the part transfer apparatus although the extendable portion 5 is preferred due to the ability to deliver or palletise parts outside of the part transfer gantry rails and cutting tool gantry rails.

Figure 2:
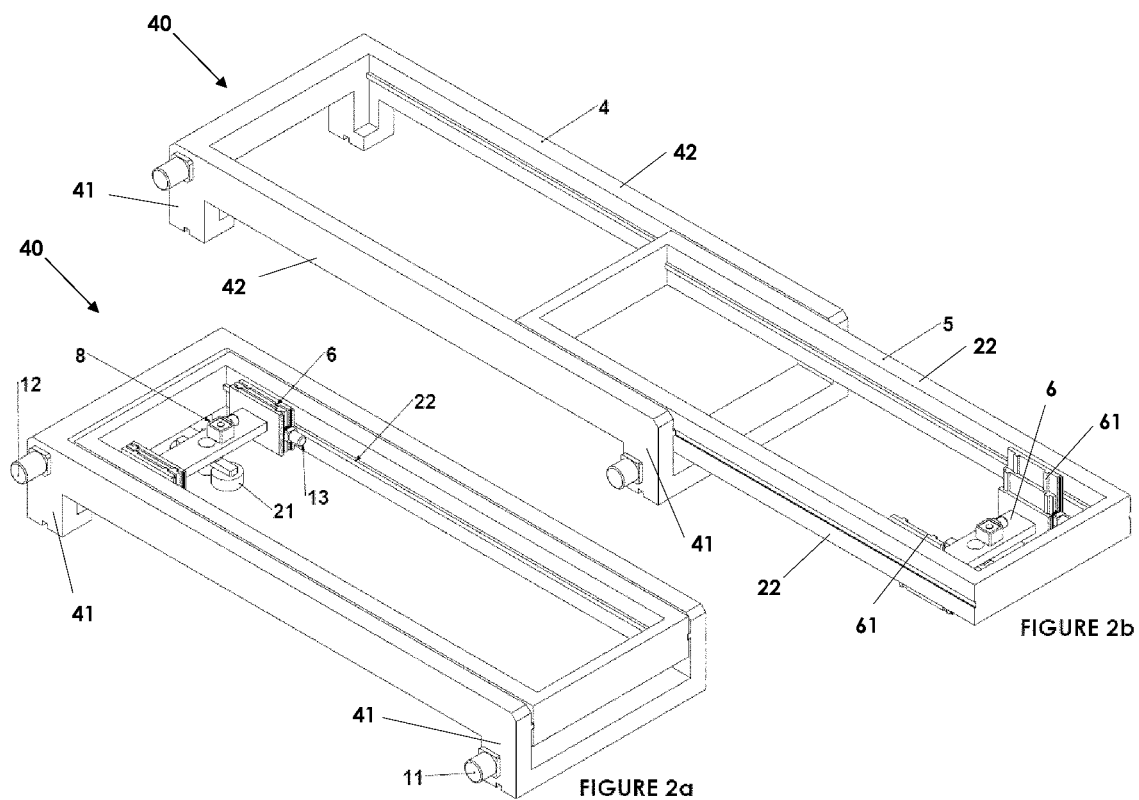
FIG. 2a is a perspective view illustration of the part transfer apparatus shown in FIG. 1 in isolation with an extendable portion in a retracted position and a lifting mechanism in a raised position.
FIG. 2b is a view illustration of the part transfer apparatus shown in FIG. 2a with the extendable portion in an extended position and the lifting mechanism in a lowered position.

With reference to FIGS. 1 to 3, the part transfer gantry 4 in this preferred embodiment is in the form of a part transfer gantry frame and the extendable portion 5 is in the form of an outwardly extendable frame moveably supported by the part transfer gantry frame. The part transfer gantry frame in this embodiment comprises vertical end support portions 41 configured to be movably supported on the part transfer gantry rails 14 and which support a pair of parallel and spaced apart horizontal cross beam members 42 spanning along the Y-axis between the vertical end support portions of the part transfer gantry frame. The outwardly projecting frame is movably supported between the pair of horizontal cross beam members of the part transfer gantry 4.

The extendable portion 5 of the part transfer apparatus, in this embodiment, comprises an outwardly projecting frame comprising a pair of lifting mechanism guide members 22 spaced apart in the X-axis and aligned parallel to the Y-axis. The pair of lifting mechanism guide members 22 are configured to movably support the lifting mechanism 6 therebetween. The outwardly projecting frame comprises a pair of end members at either end of the longitudinal guide members connecting the longitudinal guide members 22. The lifting mechanism guide members 22 in this embodiment are moveably supported by the cross beam members 42 of the part transfer gantry 4.

FIG. 3 also shows storage pallets 16 and 17 for the storage of parts that have been unloaded from the cutting table 19. The part transfer apparatus 40, after lifting a cut part 18 up off the cutting table 19 with the lifting mechanism 6 is configured to move the cut part 18 parallel to the Y-axis (e.g. in a transverse direction, across the cutting table 19), and lower the cut part 18 with the lifting mechanism 6 to a surface alongside the cutting machine 100. The part transfer apparatus 40 is configured to move the cut part 18 parallel to the Y-axis to two or more Y-axis positions adjacent the cutting machine. In this embodiment the part transfer mechanism is configured to move the cut part through a continuous range of Y-axis positions.

Figure 4:
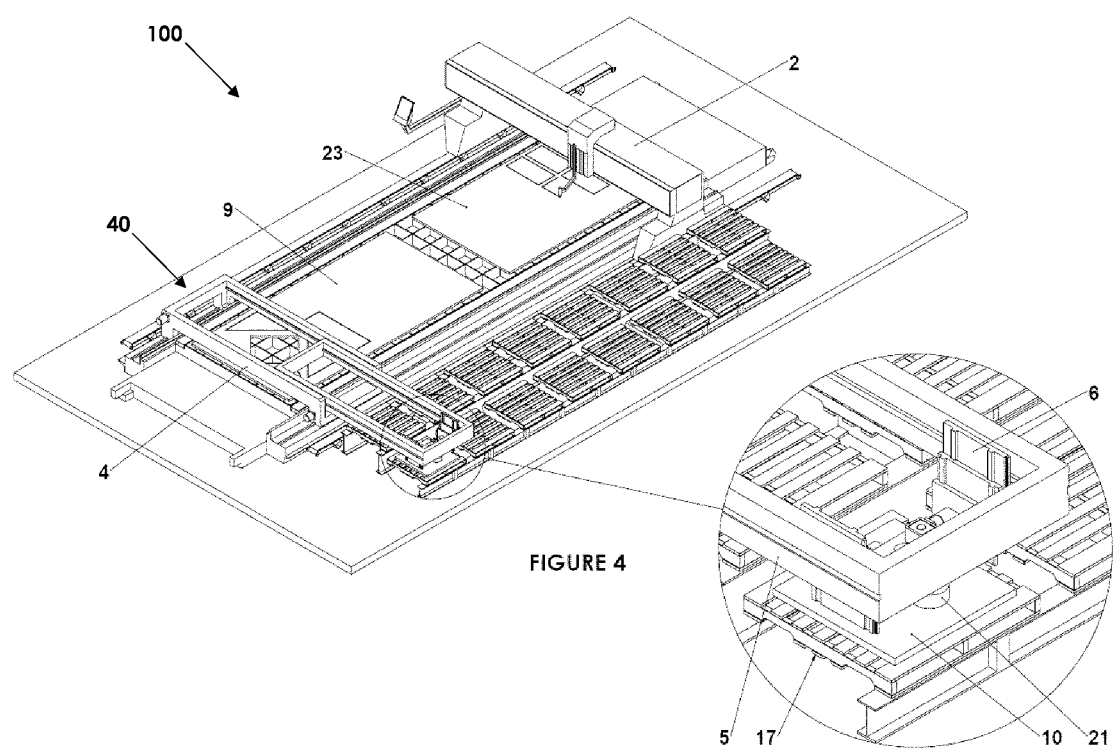
FIG. 4 is a perspective view illustration of the cutting machine of FIG. 1 with the cutting tool gantry located towards the back end of the cutting table processing a plate supported at the back end of the table and with the part transfer apparatus located towards the front end of the cutting table unloading parts that have been cut from a plate supported at the front end of the table. A detail view is also included showing a part that has been removed from the cut plate, rotated and translated by the part transfer apparatus, and placed on a storage pallet adjacent to the cutting machine.
Figure 5:
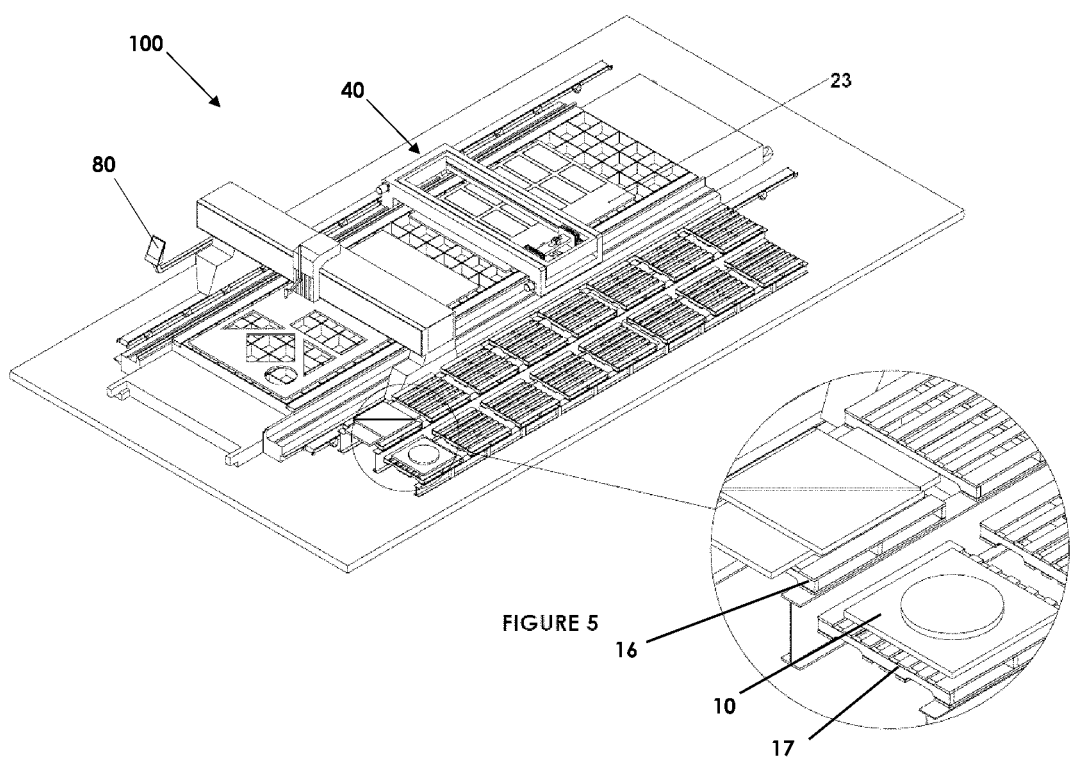
FIG. 5 is a perspective view illustration of the cutting machine of FIG. 1 showing the cutting tool gantry at the front of the cutting table and the part transfer mechanism at the back half of the cutting table. Also shown are cut parts that were stacked on storage pallets with the part transfer apparatus before the part transfer gantry passed under the cutting tool gantry to swap ends of the cutting table with the cutting tool gantry.

As shown in FIG. 3, a storage pallet 16 and a storage pallet 17 are located adjacent and outside of the cutting tool gantry rails 1 (and in FIGS. 4 and 5 it is shown that there are rows of pallets alongside the machine). Cut parts 18 are shown stacked on the pallets 16 and 17. The part transfer apparatus is configured to lift cut parts 18 from the cutting table 19, move the cut parts horizontally and release or place the cut parts 18 on to the pallets 16 and 17 or on to other parts 18 already stacked on the pallets 16 and 17. More generally, the cutting machine 100 is configured to palletise cut parts 18 using the part transfer apparatus 40.

The pallets 16 and 17 are positioned alongside the cutting machine to enable a fork or pallet truck with long forks to pick up the pallets 16 and 17 from the opposite side of the pallets 16 and 17 to the cutting machine. Pallets 16 and 17 are shown with pallet 16 higher than pallet 17 by an amount equal to the highest packing height of cut parts 18 that have been loaded onto the pallets to enable both pallets to be accessed by forklifts. Pallets 16 occupy a first position in the direction of the Y-axis and pallets 17 occupy a second position in the direction of the Y-axis. The part transfer apparatus is also configured to move cut parts 18 in X-axis directions (e.g. along the length of the cutting table). This is useful where at particular pallet or storage area to which a particular cut part 18 needs to be moved is not aligned in the X-axis with the location of the cut part on the cutting table 19.

As shown in FIG. 4, the part transfer apparatus is configured to remove cut parts from a first plate 9 supported towards a first end of the cutting table 19, while the cutting machine is simultaneously cutting parts with the cutting tool gantry 2 out of a plate supported on the cutting table 19 towards a second end of the cutting table 19 opposite the first end.

FIG. 4 shows the cutting tool gantry 2 processing parts from a second plate 23 located towards the back end (e.g. a second end) of the cutting table 19 while the part transfer gantry 4 is located towards the front (e.g. a first end) of the cutting table 19. This arrangement enables the part transfer apparatus 40 to remove cut parts 10 from the front plate 9, while simultaneously, the cutting tool gantry 2 can cut further parts from the second plate 23 with the cutting tool 7.

The detail view in FIG. 4 shows a cut part 10 having been removed from the first plate 9 and transferred using the part engaging mechanism 21 and positioned on pallet 17. The detail view shows the lifting mechanism 6 has lowered the part 10 onto pallet 17. As explained above, the part transfer apparatus is configured to pick cut parts from the plate and palletise them. The lifting mechanism may function as a part picking head. The part transfer apparatus may be used to pick parts and nest them on the pallet in an optimal or predetermined arrangement via the translation and rotation functionality provided by the part transfer gantry 4, extendable portion 5 and lifting mechanism. The cutting machine 100 may palletise the cut parts with the part transfer apparatus 40 using part profile data. That is, the data on the profiles of the parts that the machine receives in order to cut the parts from the plate.

The part transfer apparatus 100 and the cutting tool gantry 2 are configured to move between the first end of the cutting table 19 and the second end of the cutting table 19 independently of each other. The part transfer gantry 4 and the cutting tool gantry 2 are configured to move to swap ends of the cutting table 19. More generally, the cutting machine 100 is configured to remove previously cut parts 10 from a first plate 9 towards the first end of the cutting table 19 with the part transfer apparatus 40 while cutting parts from a second plate 23 towards the second end of the cutting table 19 with the cutting tool gantry 2. The cutting machine 100 is configured to subsequently move the cutting tool gantry 2 from the second end to the first end to cut parts from a third plate (not shown, to be loaded once first plate 9 is removed) and move the part transfer apparatus 40 from the first end to the second end to remove previously cut parts from the second plate 23.

FIG. 5 shows the parts removed from plate 9 and stacked on pallets 16 and 17. The part transfer apparatus 40 has moved towards the back end of the cutting machine to unload parts cut from plate 23, out of the way of the cutting tool gantry 2. The cutting tool gantry 2 has moved to the front end of the machine to continue cutting the plate 9, out of the way of the part transfer apparatus 40.

In the preferred embodiment the cutting machine 100 receives part profile data representing details of the parts to be cut, such as cutting instructions or profiles of the parts from which cutting instructions can be determined. The data may be received by a computer incorporated in or connected to the cutting machine 100 and stored in a memory of the cutting machine 100.

The cutting machine 100 also comprises a controller 80 in or connected to the computer, which receives the data and controls the various parts of the cutting machine 100. The controller 80 may be configured to control the cutting machine 100 to cut plate supported on the cutting table, for example by controlling the cutting tool gantry 2, carriage 3 and/or cutting tool 7. Additionally, or alternatively, the controller 80 may control the part transfer apparatus 40 to remove cut parts from the cutting table, for example by controlling the part transfer gantry 4, extendable portion 5, lifting mechanism 6, part engaging mechanism 21 and/or part engaging mechanism drive motor 8 along with other drive motors.

In preferred embodiments the controller 80 also controls the part transfer apparatus 40 to stack the cut parts. The cutting machine 100 receives data representing details of how the cut parts are to be removed from the cutting table. For example, the cutting machine 100 may receive instructions regarding the location outside of the cutting table on which each part is to be placed, such as on a particular pallet 16 or 17 and in a particular location on that pallet. The cutting machine 100 may also receive instructions regarding the order with which the cut parts are to be stacked on the pallets.

Finishing Apparatus

Figure 6A:
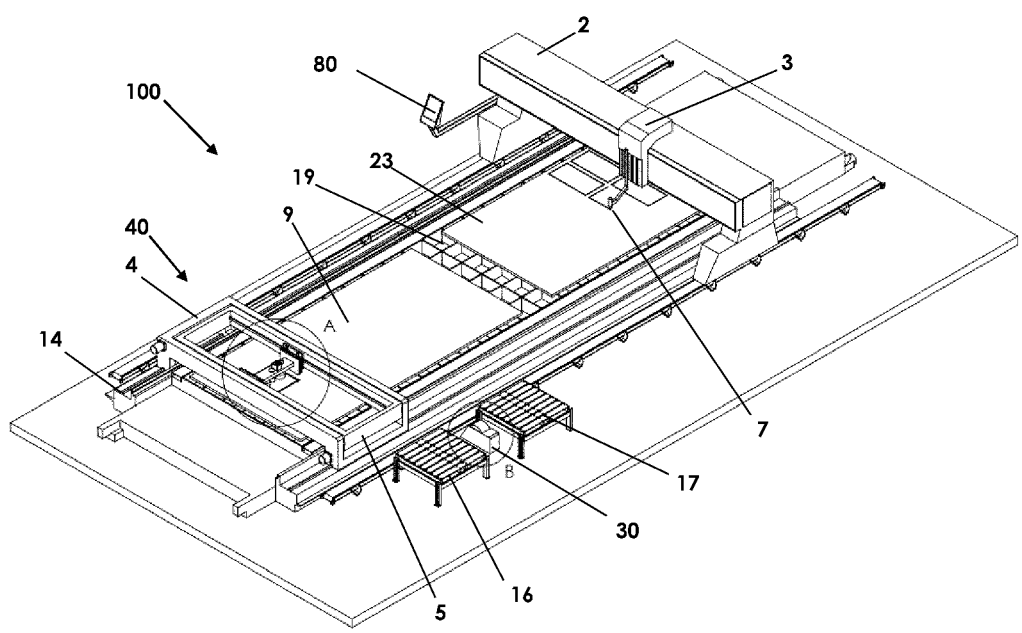
FIG. 6a is a perspective view illustration of a cutting machine according to another embodiment of the invention.

FIG. 6a shows a cutting machine 100 according to an alternative embodiment which includes a grinder 30. More generally the cutting machine may comprise any finishing apparatus such as a grinder, belt sander, wire brush/wheel or wheel with chisel edges or the like to knock or scrape off dross/burrs from the plate. Parts cut by thermal cutting processes such as flame cutting often have rough edges such as burrs or dross. In this embodiment, the cutting machine 100 is configured to grind cut parts using the grinder 30 to deburr or otherwise smooth or finish rough edges of the cut parts.

Figure 6B:
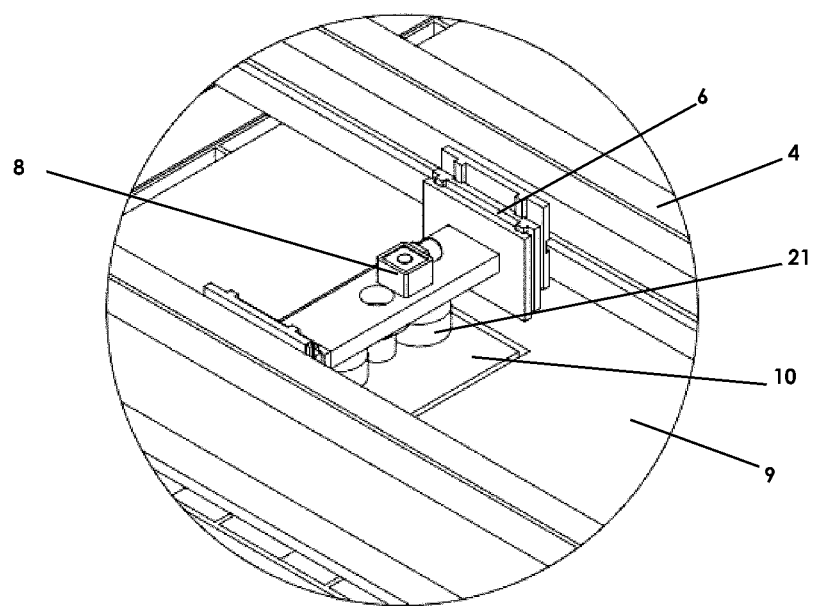
Figure 6C:
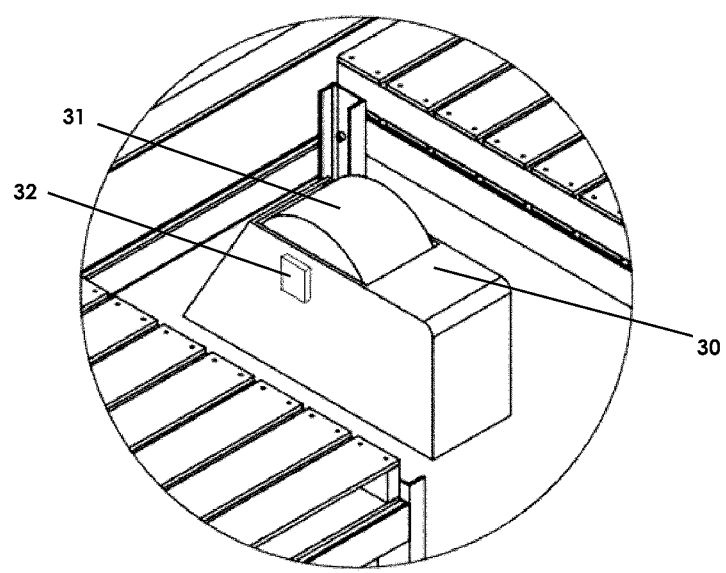

FIG. 6c shows a detail view of the grinder 30, which is positioned alongside the cutting table on the outside of the cutting tool gantry rails 1. In this embodiment the grinder 30 is separated from the other parts of the cutting machine 100. The grinder 30 may be considered part of the cutting machine 100 or may be considered a separate machine. Even if the grinder 30 is a separate machine from the parts of the cutting machine 100, the grinder 30 and cutting machine 100 may be operatively linked so as to form a single machine. In other embodiments the grinder 30 in some embodiments may be mounted on the part transfer apparatus, for example on the end of the part transfer gantry 4.

In this embodiment the grinder 30 comprises a grinding wheel 31. The grinder 30 is configured to drive the grinding wheel 31 to rotate in order to grind parts brought into contact with the grinding wheel 31.

The cutting machine may perform a method of manufacturing a cut part, using the grinder 30. The cutting machine 100 is configured to cut a parent plate 9 with the cutting tool 7 to produce a cut part 10 based on part profile data defining a profile of the cut part 10. Additionally, the cutting machine 100 is configured to move the cut part 10 with the part transfer apparatus 100 to the grinder 30 and grind the cut part 10 based on the part profile data. The cutting machine 100 preferably grinds edges of the cut part 10 based on the part profile data. The same process can be carried out using an alternative finishing apparatus such as a belt sander of wheel with chisel edges or the like.

FIG. 6b shows the part transfer gantry 4 of the part transfer apparatus 40 positioned over a cut part 10 which has been cut from a plate 9 on the cutting table of cutting machine 100. The lifting mechanism 6 is positioned over the cut part 10 and lowered by the vertically telescoping supports 6 to the cut part 10 on the surface of the cutting table 19. The magnetic engagement system 21 has engaged the cut part 10. The cutting machine 100 is configured to lift the cut part 10 and move the cut part 10 in the X-axis and/or Y-axis to bring the cut part 10 to the grinder 30.

Figure 7A:
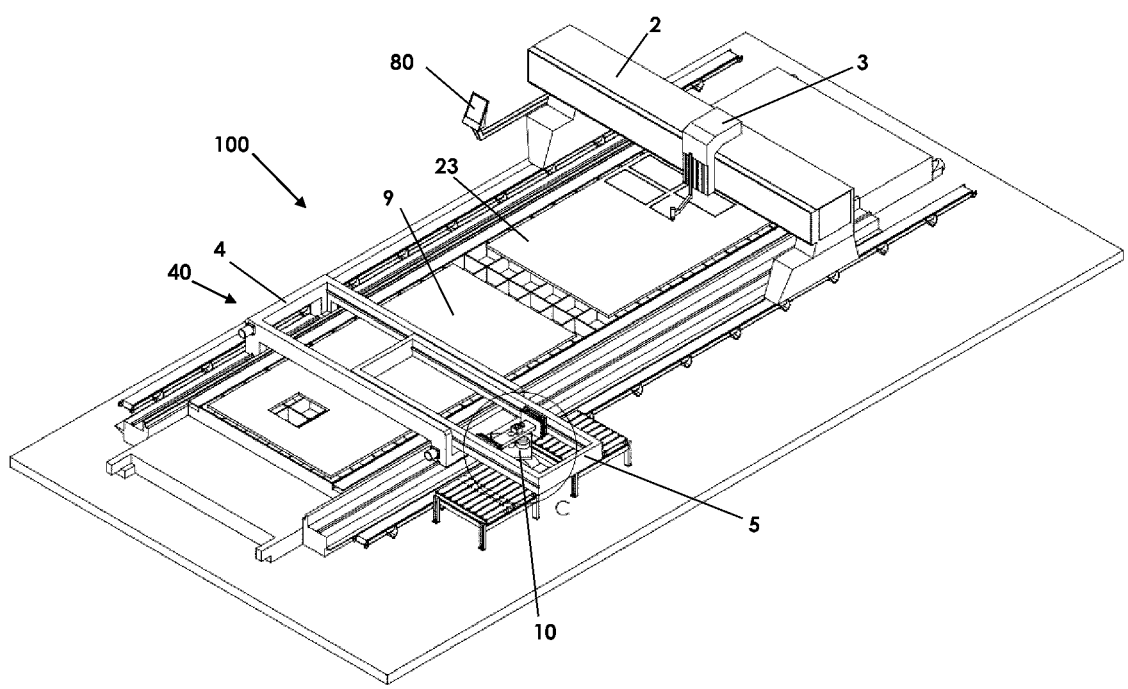
FIG. 7a is a schematic perspective view illustration of the cutting machine of FIG. 6a in another configuration in which the cutting machine is grinding a cut part with the part transfer apparatus.
Figure 7B:
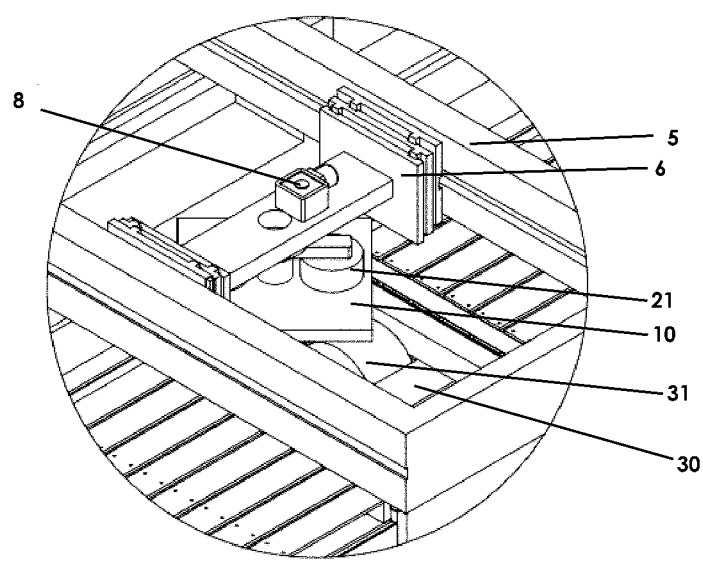
FIG. 7b is a perspective detail view illustration of the cutting machine of FIG. 6a grinding a cut part with the part transfer apparatus.

FIG. 7a shows a schematic view of the cutting machine 100 after having moved the cut part 10 to the grinder 30. The cutting machine 100 has moved the part transfer gantry 4 along the X-axis to align the lifting mechanism 6 and cut part 10 with the grinder 30 in the X-axis. Additionally, the cutting machine 100 has extended the extendable portion 5 of the horizontal transfer assembly and has moved the lifting mechanism 6 along the extendable portion 5 in the Y-axis to move the cut part 10 to the grinder 30. The cutting machine 100 is configured to bring the cut part 10 into contact with the grinding wheel 31 in order to grind the edges of the cut part 10. In addition to the X-axis and Y-axis translation, the cutting machine 100 is configured to rotate the cut part 10 about a vertical axis (e.g. the Z-axis). More particularly, the cutting machine 100 is configured to rotate the cut part 10 by rotating the part engaging mechanism 21. The cutting machine 100 is configured to grind the edges of the cut part 10 by rotating the cut part 10 to bring the edges (e.g. the entire perimeter) of the cut part 10 into contact with the grinding wheel 31. FIG. 7b shows a detail view of the cutting machine 100 grinding an edge of a cut part 10. As shown, the cutting machine 100 is in the process of rotating the cut part 10 to bring the edges of the cut part 10 into the grinding wheel 31.

In the preferred embodiment, the controller 80 controls the part transfer apparatus 40 to grind the edges of cut parts. The controller 80 is programmed (or receives instructions) to grind the cut parts. In one embodiment, the controller 80 receives data representative of the profile of each cut part and controls the part transfer apparatus 40 to bring the edges of the cut part into the grinding wheel 31. In other embodiments, the controller 80 receives and carries out predetermined instructions regarding the movements required to grind each cut part 10 on the grinder 30.

The cutting machine 100 may communicate with the grinder 30 or receive data and/or signals from the grinder 30. In preferred embodiments the cutting machine 100 is configured to monitor the speed of the grinding wheel 31 and/or the load on the motor of the grinder 30. The load on the motor may be measured by current draw, for example. The speed of the grinding wheel 31 may be measured using a speed sensor suitable for measuring the speed of rotating parts. In this embodiment, the grinder 30 comprises a wheel speed encoder 32 configured to generate a signal indicating the speed of the grinding wheel 31. Any suitable component may be used in alternative embodiments to generate a signal which can be used to identify that a part is in contact with the grinder/finishing apparatus. Monitoring the speed of the grinding wheel and/or load on the motor enables the cutting machine 100 and/or controller 80 to identify when a cut part 10 is in contact with the grinding wheel 31. An increase in load on the motor or a decrease in the speed of the grinding wheel 31 indicates that a cut part 10 is in contact with the grinding wheel 31.

Identification of contact between the cut part 10 and the grinding wheel 31 enables the controller 80 and/or computer in the cutting machine 100 to confirm that the cut part 10 is in contact with the grinding wheel 31. As the controller 80 receives information on the profiles of the cut parts 10 and their location on the cutting table, the controller 80 (or computer connected to the controller) is able to determine where the edges of the cut parts 10 are located and bring them into contact with the grinding wheel 30. However, as the dross and burrs on the edges of the parts create some uncertainty in the actual location of the edges of a cut part, the controller 80 is able to determine when the part has been brought into contact with the grinder 30 based on the measured speed or load on the grinder 30. Additionally, over time the diameter of the grinding wheel 31 will reduce due to wear. This adds further uncertainty to the distance between the edge of a cut part 10 and the diameter of the grinding wheel 31.

More generally, the cutting machine performs a method of identifying that a part is contact with the grinder (or other finishing apparatus).

In some embodiments the cutting machine may comprise two or more grinders 30. For example, a grinder 30 may be provided at each end of the cutting table 19 so that part transfer apparatus 40 is able to grind parts at either end of the cutting table 19 without interfering with the movement of the cutting tool gantry.

Marking System

Figure 8A:
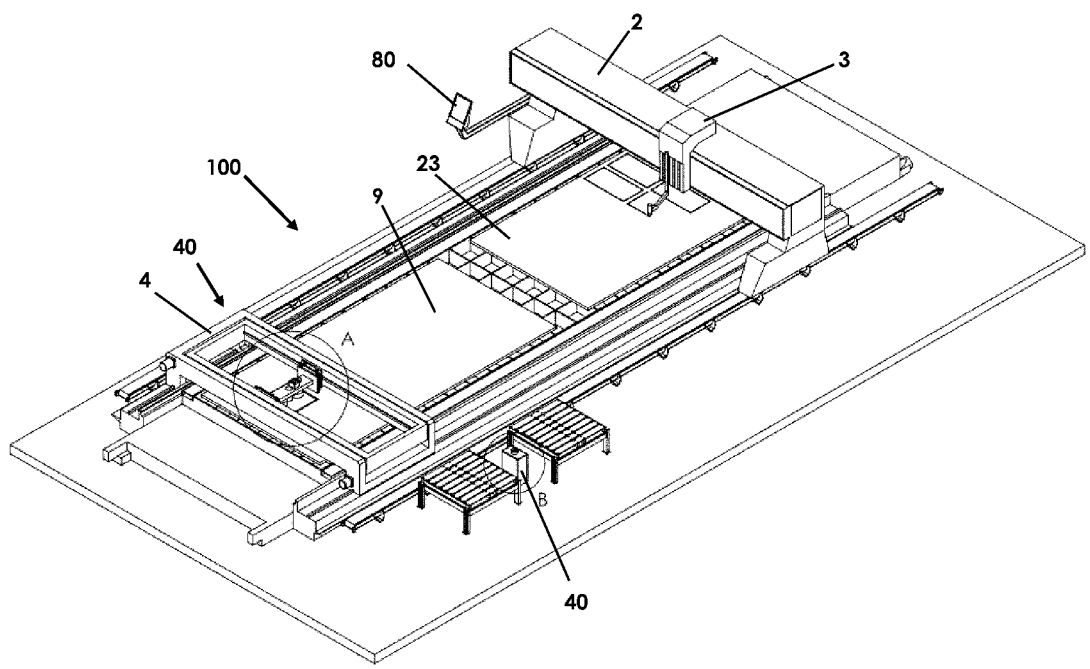
FIG. 8a is a perspective view illustration of a cutting machine according to another embodiment of the invention.

In some embodiments, the cutting machine 100 comprises a marking system. FIG. 8a shows a cutting table 100 according to one embodiment of the invention including an inkjet marker 40 alongside the other parts of a cutting machine 100 in the same location as the grinder 30 shown in FIGS. 7a and 8a. In some embodiments, the cutting machine 100 comprises both a grinder 30 and an inkjet 40, possibly a grinder and inkjet at each end of the cutting table 19.

Figure 8B:
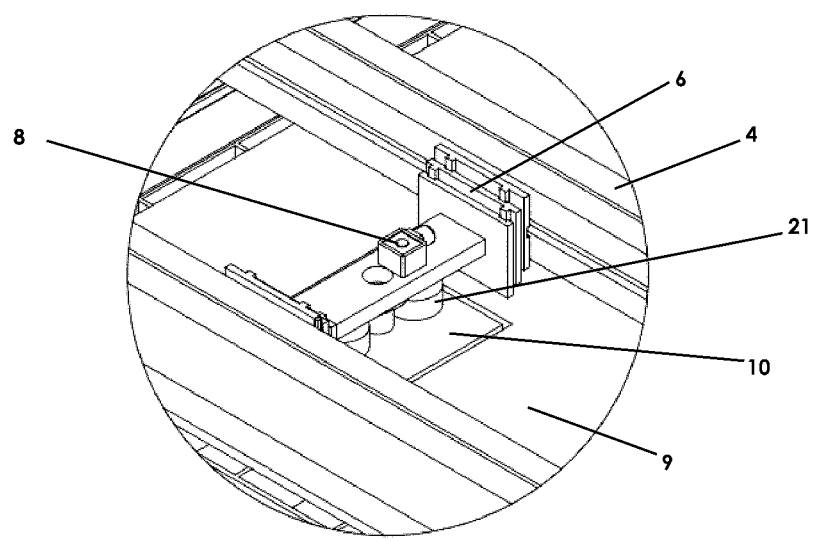
Figure 8C:
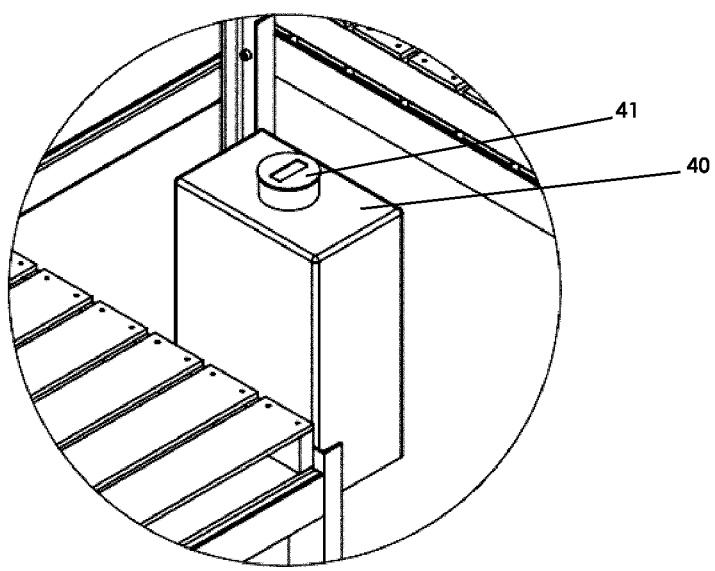
Figure 9A:
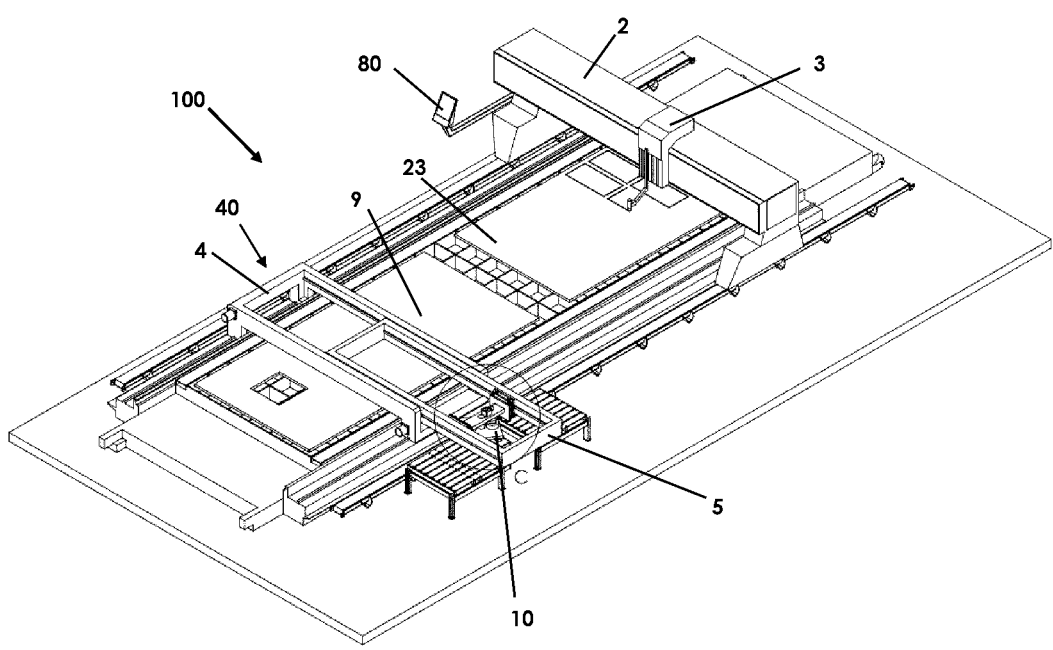
FIG. 9a is a schematic perspective view illustration of the cutting machine of FIG. 8a in another configuration in which the cutting machine is marking a cut part with the part transfer apparatus.
Figure 9B:
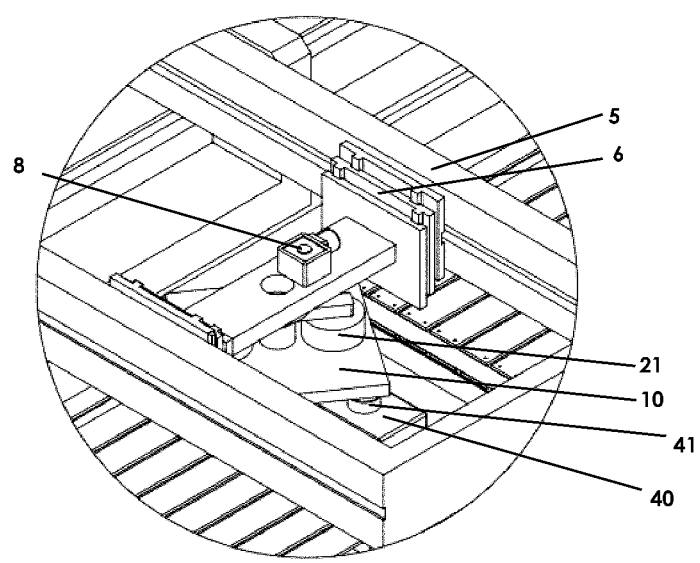
FIG. 9b is a perspective detail view illustration of the cutting machine of FIG. 8a marking a cut part.

The inkjet marker 40 may be configured to mark the underside of cut part 10. As shown in FIG. 8b, the part transfer apparatus may lift a cut part from a parent plate 9 using the part transfer gantry 4 and lifting mechanism. The part transfer apparatus is configured to move the cut part 10 to the inkjet marker 40 in a similar manner as described above in relation to moving the cut part 10 from the cutting table to the grinder 30. The inkjet marker 40 comprises an inkjet marker head 41. The part transfer apparatus is configured to move a cut part 10 over the inkjet marker head 41 to be marked. The controller 80 may control the inkjet marker 40 to mark the cut part 10 and/or receive a signal from the inkjet marker 40 confirming that the part has been marked.

An advantage to the cutting machine 100 with an inkjet marker 40 provided alongside the table is that the underside of the cut part 10 is marked. It may be desirable to mark the underside of the cut part 10 when the top of the part is wet from coolant. In alternative embodiments, the cutting machine comprises an inkjet marker provided on the part transfer apparatus for marking cut parts. The inkjet marker may be provided on the lifting system and configured to mark the cut parts while the part transfer apparatus is moving the cut parts. Advantageously, if the inkjet marker is provided off the table or on the part transfer apparatus, the inkjet marker can be flushed with solvent away from the cutting tool 7. This reduces the risk of sparks igniting flammable solvent. Additionally, the cutting machine can simultaneously mark cut parts 10 at one end of the table while the cutting tool 7 is cutting further parts from a second plate at the other end of the table.

In some embodiments, the cutting machine 100 comprises both a grinder 30 and inkjet marker 40. The cutting machine 100 may be configured to cut a second plate 23 at one end of the table while, simultaneously, the part transfer apparatus moves cut parts 10 from a first plate 9 to the grinder 30 for grinding of the edges of the cut parts 10, then to the inkjet marker for marking of the cut parts 10, and then to pallets 16 and 17 to be stacked in an optimal orientation and order. When the cutting machine 100 has finished cutting parts from the second plate 23 and all the cut parts 10 from the first plate 9 have been removed, grinded, marked and palletised, a new plate can be placed at the first end of the cutting table in place of the first plate 9. The part transfer apparatus and cutting tool gantry 2 can then switch ends during which the part transfer gantry 4 passes underneath and within the cutting tool gantry, and then the cutting tool gantry 2 may begin cutting parts from the new plate, while the part transfer apparatus unloads and palletises the parts cut from the plate 23.

Exemplary Method

Figure 10:
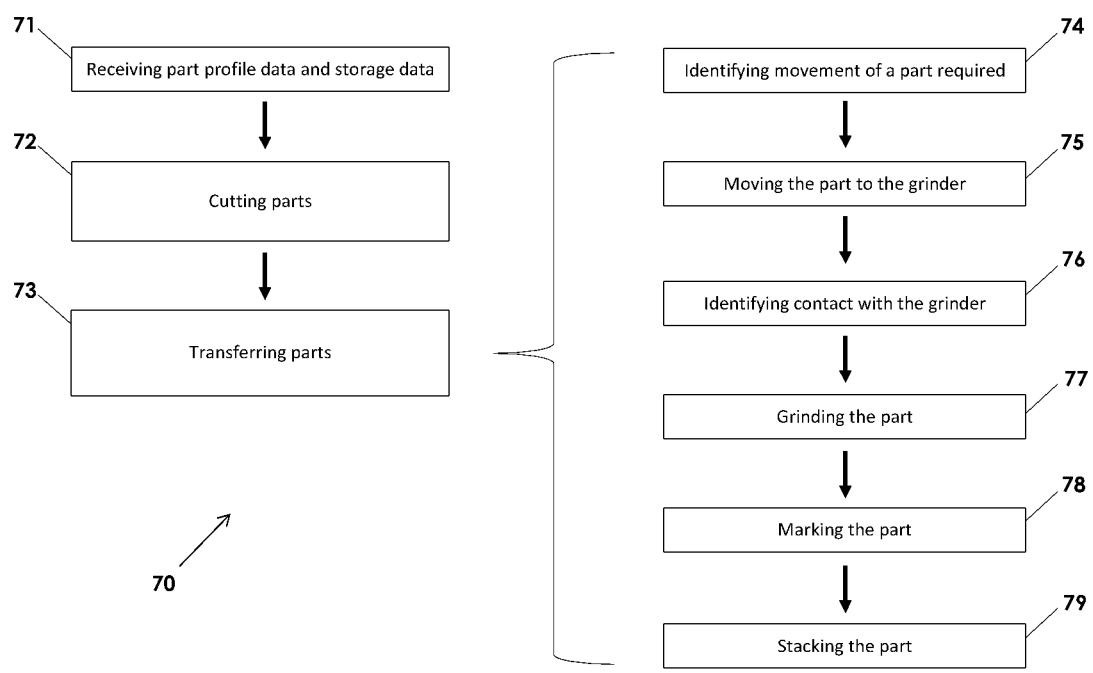
FIG. 10 is a flow chart of a method of cutting and storing a part.

FIG. 10 is flow chart summarising a method 70 of cutting and storing parts with a cutting machine having a part transfer apparatus and controller (such as cutting machine 100). The cutting machine preferably comprises both a grinder (such as grinder 30) and a marking system (such as inkjet marker 40). The cutting machine may perform the method 70 using one or more controllers of the cutting machine.

At step 71 of the method 70, the controller receives part profile data defining shapes and locations of parts to be cut from a plate by the cutting machine (e.g. by a cutting tool gantry with a cutting tool mounted thereon). The shapes and locations form a nest of parts to be cut from the plate. Also at step 71, the controller receives storage data indicating a predetermined storage arrangement of the parts. The predetermined storage arrangement is the arrangement of the parts immediately after unloading from the machine. The storage data may therefore include a predetermined storage location, which may be the location at which the part is to be placed after transfer away from the skeleton of the plate, such as a location on a pallet alongside the machine (possibly one of multiple pallets as shown in FIG. 4). The storage data may also include a predetermined storage orientation for each part, which is the orientation that the part is to have when delivered to the predetermined storage location. Further still, the storage data may include stacking data defining one or more stacks of parts. The stacking data is used by the cutting machine/controller to cut and transfer parts to form stacks ordered in a particular manner. The stacking data along with other storage data (e.g. data on predetermined storage location and predetermined storage orientation for each part) enables stacks of specific select parts in specific orientations to be formed at specific locations.

At step 72 of the method 70, the cutting machine cuts the parts based on the part profile data. The part profile data is used to determine the profiles of the parts to cut (e.g. the paths of the cuts made by the cutting tool and where those paths are located on the plate). The storage data may be used to determine the order in which the parts are cut from the plate, in some embodiments. In one example, the cutting machine may use the storage data to cut parts that are to be at the bottom of stacks before parts that are in the middle or at the top of stacks. Additionally, or alternatively, the cutting machine may use the storage data to cut a series of parts in order to cut all of the parts of a full stack for a first pallet before beginning to cut the parts of a second full stack on a separate pallet, enabling the first pallet to be filled and removed and replaced by an empty pallet sooner rather than later. In many embodiments the cutting tool cuts all the parts from a first plate before moving to a second plate, at which time the part transfer apparatus moves to the first plate to transfer and stack the parts.

At step 73 of the method 70, the cutting machine transfers parts away from the plate with the part transfer apparatus based on the part profile data and the storage data. The part profile data is used so that the location and orientation of the part is taken into account, enabling the part transfer apparatus to be controlled to extract correct parts from the nest.

In preferred embodiments the part profile data includes actual locations (e.g. coordinates) of the parts on the cutting table having been cut. The cutting machine may include a plate locating means such as a laser with which the machine is configured to determine the location of a plate to be cut on the cutting table. The actual part locations once cut can be determined by the controller receiving part cutting instructions, receiving plate location information, and determining part locations accordingly based on the locations of where the cuts were actually made after the actual plate location was taken into account. In preferred embodiments, the part profile data defines shape and location of a plurality of parts to be cut from a plate based on a location of the plate. The location of the plate may be different every time a plate is loaded onto the cutting table. Accordingly, the location of the plate on the cutting table may be determined by the cutting machine, in some embodiments by a measuring tool provided to the cutting tool gantry (or alternatively the part transfer gantry).

The storage data is used so that the predetermined storage location and orientation of the parts can be taken into account, enabling the part transfer apparatus to deliver the parts to the intended location and in the correct orientation. The part transfer apparatus may incorporate a part transfer gantry, moveable lifting mechanism and rotatable part engaging mechanism (such as the part transfer gantry 4, lifting mechanism 6 and part engaging mechanism 21 of the cutting machine 100 as shown in FIGS. 1-9) and use these components to translate and rotate the parts.

The cutting machine may perform steps 72 and 73 simultaneously on different parts. For example, the cutting machine may cut parts from a plate at one end of a cutting table with a cutting tool gantry (e.g. cutting tool gantry 2 as shown in FIG. 1) while the cutting machine transfers parts from a plate at the other end of the cutting machine.

At a sub-step 74 of step 73 method 70, the cutting machine identifies movement required to move each part. In some embodiments the cutting machine moves parts from their locations in the nest directly to the predetermined storage locations. In other embodiments the cutting machine first moves parts to a grinder to the grind the edges of the parts and/or a marking system to mark the parts. Where a part is to be moved, the cutting machine identifies horizontal, vertical and/or rotational movement required based on the part profile data indicating its position within the nest or, if it has already been engaged by the part transfer apparatus, the position of the part transfer apparatus. At step 75 of the exemplary method 70, after extracting a part from the nest the cutting machine moves the part to a finishing apparatus, which in this embodiment is a grinder (such as grinder 30 of the cutting machine 100). The finishing apparatus could alternatively be another suitable apparatus such as a wheel with a number of chisel edges which rotate to knock dross/burrs off the plates.

At step 76, the cutting machine identifies contact between the part and the grinder (e.g. between the part and a grinding wheel/belt of the grinder, or alternatively the chisel edges of a rotating wheel). Contact may be identified by receiving a signal from the grinder and identifying that the part is in contact with the grinder based on the signal. The signal may indicate one or both of the speed of a grinding wheel of the grinder or the load on the motor of the grinder or other finishing apparatus. For example, the cutting machine may identify contact based on a reduction in the speed of the grinding wheel or an increase in the load (e.g. current draw) of the motor.

At step 77, the cutting machine grinds the part (or smooths the edges) with the grinder/finishing apparatus and part transfer apparatus. The part transfer apparatus may bring the part into contact with the grinder and then, based on the location of the perimeter edges of the part as indicated by the part profile data, the part transfer apparatus rotates and translates the part as required to bring the edges of the part into contact with the grinder to smooth the edges of the part.

In other embodiments, the cutting machine comprises another finishing apparatus other than a grinder, such as wire wheel, wheel with chisel edges to knock off dross, belt sander or the like, and performs the method above using the alternative finishing apparatus.

In some examples, after grinding/finishing, the cutting machine may transfer the part to its predetermined storage location. In the exemplary method 70, at step 78 the cutting machine moves the cut part to a marking system (such as an inkjet marker) for marking based on the part profile data (which provides information on the shape and size of the part to be marked).

After any marking and/or finishing/grinding, at step 79 of the method 70, the cutting machine may complete the transfer of the part away from the cutting table. The cutting machine may complete final translational and rotational movement to deliver the part to the predetermined storage location in the predetermined storage orientation.

Though the part transfer apparatus is shown being used with a thermal cutting machine, in alternative embodiments the apparatus of the present invention is utilized on other types of machines that cut parts in two zones. Furthermore, in some alternative embodiments the part transfer apparatus is utilised on pass through cutting machines and does not need to swap ends with a cutting tool gantry. In such a machine the part transfer apparatus may be useful for unloading a plate that has been moved along the cutting table away from a cutting tool gantry. This may avoid or at least reduce the need for manual lifting of parts, or lifting of parts with an overhead crane.

In alternative embodiments, the storage area is located inside cutting machine rails. This would eliminate the requirement for the part unloading apparatus to extend outwardly past the machine rails of the cutting tool gantry, if that requirement was desired to be eliminated in a particular implementation. In such an embodiment, the part transfer mechanism is configured to move the cut part in the X-axis and lower the cut part with the lifting mechanism to a surface adjacent the cutting machine in the direction of the X-axis.

Preferred embodiments of the invention may have one or more of the following advantages:
- Parts can be removed from a cutting table without the need for a worker to climb on the table;
- One part transfer apparatus can work with a cutting machine that processes two plates in two separate locations (e.g. ends) so that the part removal and part cutting can occur simultaneously;
- The part transfer apparatus can pass under the cutting tool gantry so that only one part transfer apparatus is required to service two cutting zones;
- The part transfer apparatus can rotate parts to place them on a pallet to make a safe stack with nested parts on layers;
- Automated loading of parts onto pallets avoids the need for manual identification; and/or
- Parts can be rotated and placed onto a storage position to stack the parts automatically so that the parts are placed to minimise layers.

Unless the context clearly requires otherwise, throughout the description and the claims, the words "comprise", "comprising", and the like, are to be construed in an inclusive sense as opposed to an exclusive or exhaustive sense, that is to say, in the sense of "including, but not limited to".

The entire disclosures of all applications, patents and publications cited above and below, if any, are herein incorporated by reference.

Reference to any prior art in this specification is not, and should not be taken as, an acknowledgement or any form of suggestion that that prior art forms part of the common general knowledge in the field of endeavour in any country in the world.

The invention may also be said broadly to consist in the parts, elements and features referred to or indicated in the specification of the application, individually or collectively, in any or all combinations of two or more of said parts, elements or features.

Where in the foregoing description reference has been made to integers or components having known equivalents thereof, those integers are herein incorporated as if individually set forth.

It should be noted that various changes and modifications to the presently preferred embodiments described herein will be apparent to those skilled in the art. Such changes and modifications may be made without departing from the spirit and scope of the invention and without diminishing its attendant advantages. It is therefore intended that such changes and modifications be included within the present invention.

The invention claimed is:

1. A cutting machine comprising:
    a cutting table having a first end and a second end aligned along an X-axis;
    a cutting tool gantry configured to cut parts from plate supported on the cutting table, the cutting tool gantry spanning the cutting table in a Y-axis perpendicular to the X-axis and being configured to travel along the X-axis between the first end and the second end; and
    a part transfer apparatus configured to remove cut parts from the cutting table, the part transfer apparatus being configured to lift cut parts lying on the cutting table upwardly off of the cutting table, the part transfer apparatus being configured to travel above the cutting table along the X-axis between the first end and the second end,
    wherein the part transfer apparatus is able to pass underneath the cutting tool gantry while travelling above the cutting table along the X-axis.

2. The cutting machine of claim 1, wherein the part transfer apparatus is configured to, after lifting cut parts vertically from the cutting table, move the cut parts horizontally, rotate the cut parts and release the cut parts away from the cutting table.

3. The cutting machine of claim 1, wherein the part transfer apparatus comprises:
    a horizontal transfer assembly configured to travel parallel to the X-axis between the first end and the second end of the cutting table; and
    a lifting mechanism provided to the horizontal transfer assembly,
    wherein the part transfer apparatus is configured to lift a cut part vertically off the cutting table with the lifting mechanism and move the cut part horizontally away from the cutting table with the horizontal transfer assembly.

4. The cutting machine of claim 3, wherein the horizontal transfer assembly comprises a part transfer gantry spanning the cutting table parallel to the Y-axis, the part transfer gantry being moveably supported on part transfer gantry rails.

5. The cutting machine of claim 4, wherein the cutting tool gantry is moveably supported on cutting tool gantry rails located outwardly of the pair of part transfer gantry rails with respect to the cutting table.

6. The cutting machine of claim 4, wherein the horizontal transfer assembly comprises an extendable portion moveably supported by the part transfer gantry and configured to move with respect to the part transfer gantry parallel to the Y-axis, the lifting mechanism being supported on the extendable portion.

7. The cutting machine of claim 6, wherein the extendable portion is telescopically connected to the part transfer gantry.

8. The cutting machine of claim 6, wherein the lifting mechanism is moveably supported on the extendable portion to move along the extendable portion.

9. The cutting machine of claim 6, wherein the lifting mechanism comprises a part engaging portion configured to be moved vertically with respect to the part transfer gantry.

10. The cutting machine of claim 1, wherein the cutting machine is configured to remove previously cut parts from a first plate towards the first end of the cutting table with the part transfer apparatus while cutting parts from a second plate towards the second end of the cutting table with the cutting tool gantry.

11. A part transfer apparatus for a cutting machine, the cutting machine having a cutting tool gantry with at least one cutting tool configured to cut parts from a plate supported on a cutting table, the cutting table having a first end and a second end aligned along an X-axis, the part transfer apparatus comprising:
- a horizontal transfer assembly configured to travel parallel to the X-axis between the first end and the second end, the horizontal transfer assembly configured to pass underneath the cutting tool gantry while travelling along the X-axis; and
- a lifting mechanism provided to the horizontal transfer assembly,
- wherein the part transfer apparatus is configured to lift a cut part vertically off the cutting table with the lifting mechanism and move the cut part horizontally away from the cutting table with the horizontal transfer assembly.

12. The part transfer apparatus of claim 11, wherein the horizontal transfer assembly comprises a part transfer gantry configured to span across the cutting table parallel to a Y-axis perpendicular to the X-axis.

13. The part transfer apparatus of claim 12, wherein the horizontal transfer assembly comprises an extendable portion moveably supported on the part transfer gantry and configured to move with respect to the part transfer gantry parallel to the Y-axis, the lifting mechanism being supported on the extendable portion.

14. The part transfer apparatus of claim 13, wherein the extendable portion is telescopically connected to the part transfer gantry.

15. The part transfer apparatus of claim 13, wherein the lifting mechanism is moveably supported on the extendable portion to move along the extendable portion.

16. A cutting machine comprising:
- a cutting table configured to support a plate thereon;
- a cutting tool gantry above the cutting table and having at least one cutting tool mounted thereon, the cutting tool gantry configured to cut parts from a plate supported on the cutting table; and
- a part transfer gantry above the cutting table configured to remove cut parts from the cutting table, the part transfer gantry being configured to lift cut parts lying on the cutting table upwardly off of the cutting table;
- wherein the cutting tool gantry and the part transfer gantry are configured to move to switch between ends of the cutting table.

17. The cutting machine of claim 16, wherein the cutting tool gantry is supported on a first pair of rails, the cutting table being located between the first pair of rails, and the part transfer gantry is supported on a second pair of rails, each one of the second pair of rails being located inside of the first pair of rails.

18. The cutting machine of claim 16, wherein the part transfer gantry comprises an outside width less than an inside width of the cutting tool gantry and an outside height less than an inside height of the cutting tool gantry.

19. The cutting machine of claim 16, wherein the part transfer gantry is able to pass underneath the cutting tool gantry.

20. The cutting machine of claim 16, wherein the cutting machine is configured to remove previously cut parts from a first plate towards a first end of the cutting table with the part transfer gantry while cutting parts from a second plate towards a second end of the cutting table with the cutting tool gantry, and wherein the cutting machine is configured to subsequently move the cutting tool gantry from the first end to the second end to cut parts from a third plate and move the part transfer gantry from the second end to the first end to remove previously cut parts from the second plate.

* * * * *